United States Patent
Watanabe et al.

(10) Patent No.: US 6,484,609 B2
(45) Date of Patent: Nov. 26, 2002

(54) METHOD OF PRODUCING PRESS-FORMING PUNCH AND DIE

(75) Inventors: Teiji Watanabe, Hamamatsu (JP); Masafumi Nakamura, Hamamatsu (JP); Yoshikazu Nakamura, Hamamatsu (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/782,846

(22) Filed: Feb. 14, 2001

(65) Prior Publication Data

US 2001/0013264 A1 Aug. 16, 2001

(30) Foreign Application Priority Data

Feb. 15, 2000 (JP) .......................... 2000-037177

(51) Int. Cl.⁷ ................................ B21K 5/20
(52) U.S. Cl. ...................... 76/107.1; 72/466.8
(58) Field of Search .................... 76/107.1, 101.1, 76/107.4; 72/462, 466.8

(56) References Cited

U.S. PATENT DOCUMENTS

| | | | | |
|---|---|---|---|---|
| 2,465,019 A | * | 3/1949 | Johnson | 76/101.1 |
| 3,101,065 A | * | 8/1963 | Kalis | 72/466.8 |
| 3,343,430 A | * | 9/1967 | Haas et al. | 76/107.1 |
| 3,727,489 A | * | 4/1973 | Inoue | 76/107.1 |
| 4,088,046 A | * | 5/1978 | Severinsson | 76/107.1 |
| 4,987,799 A | * | 1/1991 | Soth | 76/107.1 |
| 5,813,276 A | * | 9/1998 | Maeda | 72/462 |
| 6,279,425 B1 | * | 8/2001 | Cicotte | 76/107.1 |

OTHER PUBLICATIONS

Specification of Application No.: 09/783,357.
Specification of Applicatio No.: 09/741,554.

* cited by examiner

*Primary Examiner*—Hwei-Siu Payer
(74) *Attorney, Agent, or Firm*—Merchant & Gould, P.C.

(57) ABSTRACT

An economical method of producing a press-forming die is disclosed wherein a master die and a master punch are relatively reciprocated with a full stroke and a shorter stroke to produce a press-formed panel and a half-pressed panel. After an elastic material is applied to one surface of the half-pressed panel, the press-formed panel is fitted over the master punch, and the half-pressed panel is forced against the press-formed panel with the elastic material facing away from the press-formed panel, whereby the half-pressed panel is shaped into a die panel complementary in contour to the shape of the press-formed panel. A back-up material such as high-strength cement is then applied to the rear surface of the die panel whereby a press-forming die is produced.

22 Claims, 19 Drawing Sheets

METHOD OF PRODUCING PRESS-FORMING PUNCH AND DIE

BACKGROUND OF THE INVENTION

1. Field of the Invention

This invention relates to a method of producing a cooperating pair of punch and die used for pressing-forming a blank material into a panel product.

2. Description of the Related Art

Many parts of a motor vehicle, such as a fuel tank of a motorcycle, are produced by press working. In the press working, a press-forming die assembly formed from a precision-machined alloy steel is used in general. The alloy steel press-forming die assembly is highly durable and hence is able to recover its manufacturing cost when used in mass manufacturing systems of vehicle parts.

In recent years, model changes of motorcycles tend to occur at a relatively short cycle time, and the manufacturing system tends to shift from mass'manufacturing of one type of product to more flexible manufacturing of a wide variety of products with relatively low volume of production. The alloy steel press-forming die assembly, when used in flexible manufacturing systems, may sometimes fail to recover its manufacturing cost, leading to a cost-up of the final product.

With the foregoing problem in view, a press-forming die assembly formed from a synthetic resin is generally used for flexible manufacturing systems. The synthetic resin press-forming die assembly is relatively easy to manufacture and can be manufactured at a low cost as compared to the alloy steel press-forming die assembly. Accordingly, even when the model change cycle of the motorcycle is relatively short, the synthetic resin press-forming die assembly is able to recover its manufacturing cost and hence prevents a cost-up of the final product.

However, a working surfaces of the synthetic resin press-forming die assembly is softer than that of the alloy steel press-forming die assembly and hence is susceptible to wear in a relatively short period of use. Once wear occurs on the working surfaces, it is difficult to maintain the desired accuracies of the press-formed products. Accordingly, in order to maintain the desired product accuracies, the synthetic resin press-forming die assembly must be replaced before the working surface is worn away. With is requirement, the synthetic resin press-forming die assembly is replaced in a relatively short cycle and may sometimes fails to recover its manufacturing cost.

Another known relatively low-cost press-forming die assembly is made of a zinc alloy generally called "ZAS". The ZAS is a zinc-based alloy containing aluminum and antimony and hence has a relatively low melting point such as about 380° C. Because of this low molting point, the ZAS press-forming die assembly can be manufactured at a relatively low cost.

However, a working surface of the ZAS press-forming die assembly is relatively soft and hence is poor in durability as compared to that of the alloy steel press-forming die assembly. Due to a relatively short replacement cycle, the ZAS press-forming die assembly may sometime fail to recover its manufacturing cost.

There has been a keen demand for a press-forming die assembly which can be manufactured at a reduced cost and has high durability comparable to that of the alloy steel press-forming die assembly.

SUMMARY OF THE INVENTION

It is accordingly an object of the present invention to provide a method of producing a highly durable press-forming die assembly (punch and die) at a relatively low cost.

According to a first aspect of the present invention, there is provided a method of producing a press-forming die, comprising the steps of: preparing a master die and a master punch relatively movable toward and away from each other so as to define therebetween a die cavity; relatively reciprocating the master die and the master punch together while a first blank sheet is disposed between the master die and the master punch, thereby press-forming the first blank sheet into a press-formed panel complementary in contour to the shape of the die cavity; while a second blank sheet is disposed between the master die and the master punch, relatively reciprocating the master die and the master punch together with a stroke smaller than the stroke achieved when the press-formed panel is produced, thereby producing a half-pressed panel; applying an elastic material onto one surface of the half-pressed panel which has been situated in face to face with the master die; fitting the press-formed panel over the master punch and placing the half-pressed panel over the press-formed panel with the elastic member facing away from press-formed panel; forcing the half-pressed panel against the press-formed panel via the elastic material to thereby shape the half-pressed panel into a die panel complementary in contour to the shape of the press-formed panel; and applying a back-up material to the rear surface of the die panel to thereby produce a press-forming die.

According to another aspect of the present invention, there is provided a method of producing a press-forming punch, comprising the steps of: preparing a master die and a master punch relatively movable toward and away from each other so as to define therebetween a die cavity; relatively reciprocating the master die and the master punch together while a first blank sheet is disposed between the master die and the master punch, thereby press-forming the first blank sheet into a press-formed panel complementary in contour to the shape of the die cavity; while a second blank sheet is disposed between the master die and the master punch, relatively reciprocating the master die and the master punch together with a stroke smaller than the stroke achieved when the press-formed panel is produced, thereby producing a half-pressed panel; applying an elastic material onto one surface of the half-pressed panel which has been situated in face to face with the master punch; fitting the press-formed panel over the master die and placing the half-pressed panel over the press-formed panel with the elastic member facing away from press-formed panel; forcing the half-pressed panel against the press-formed panel via the elastic material to thereby shape the half-pressed panel into a punch panel complementary in contour to the shape of the press-formed panel; and applying a back-up material to the rear surface of the punch panel to thereby produce a press-forming punch.

It is preferable that between the forcing step and the applying step, the method comprises the additional step of applying a backing material to the rear surface of the die panel or the rear surface of the punch panel. The backing material comprises a water-soluble epoxy resin, and preferably a fibre-reinforced water-soluble epoxy resin.

The die panel or the punch panel is preferably made of steel, such as stainless steel or high-tensile steel, and has been subjected to work-hardening processes when the second blank sheet is press-formed into the half-pressed panel and the half-pressed panel is forced against the press-formed panel. The work-hardened die panel and punch panel have an increased surface hardening and hence they are highly resistant to wear.

The elastic material comprises urethane rubber. When the die panel or the punch panel has a rectilinear portion extending parallel to the axis of relative movement the master die and punch, the elastic material is preferably elastically deformable to an extent more than twice of the thickness of the second blank sheet. By using such elastic material, it is possible to produce a pressure or force distributed uniformly over the entire surface of the half-pressed panel while the half-pressed panel is forced against the press-formed panel.

The back-up material may be a high-strength cement or synthetic resin. When the high-strength cement is used, the applying step includes placing a slurry of high-strength cement on the rear surface of the die panel or the punch panel while removing babbles from the slurry by the action of a vacuum. It is preferable that the applying step further includes applying vibrations to the slurry to promote separation of the babbles from the slurry.

The above and other objects, features and advantages of the present invention will become manifest to those versed in the art upon making reference to the following description and accompanying sheets of drawings in which certain preferred structural embodiments incorporating the principle of the invention are shown by way of illustrative example.

DETAILED DESCRIPTION OF THE PREFERRED EMBODIMENT

The following description is merely exemplary in nature and is in no way intended to limit the invention or its application or use.

Figure 1:
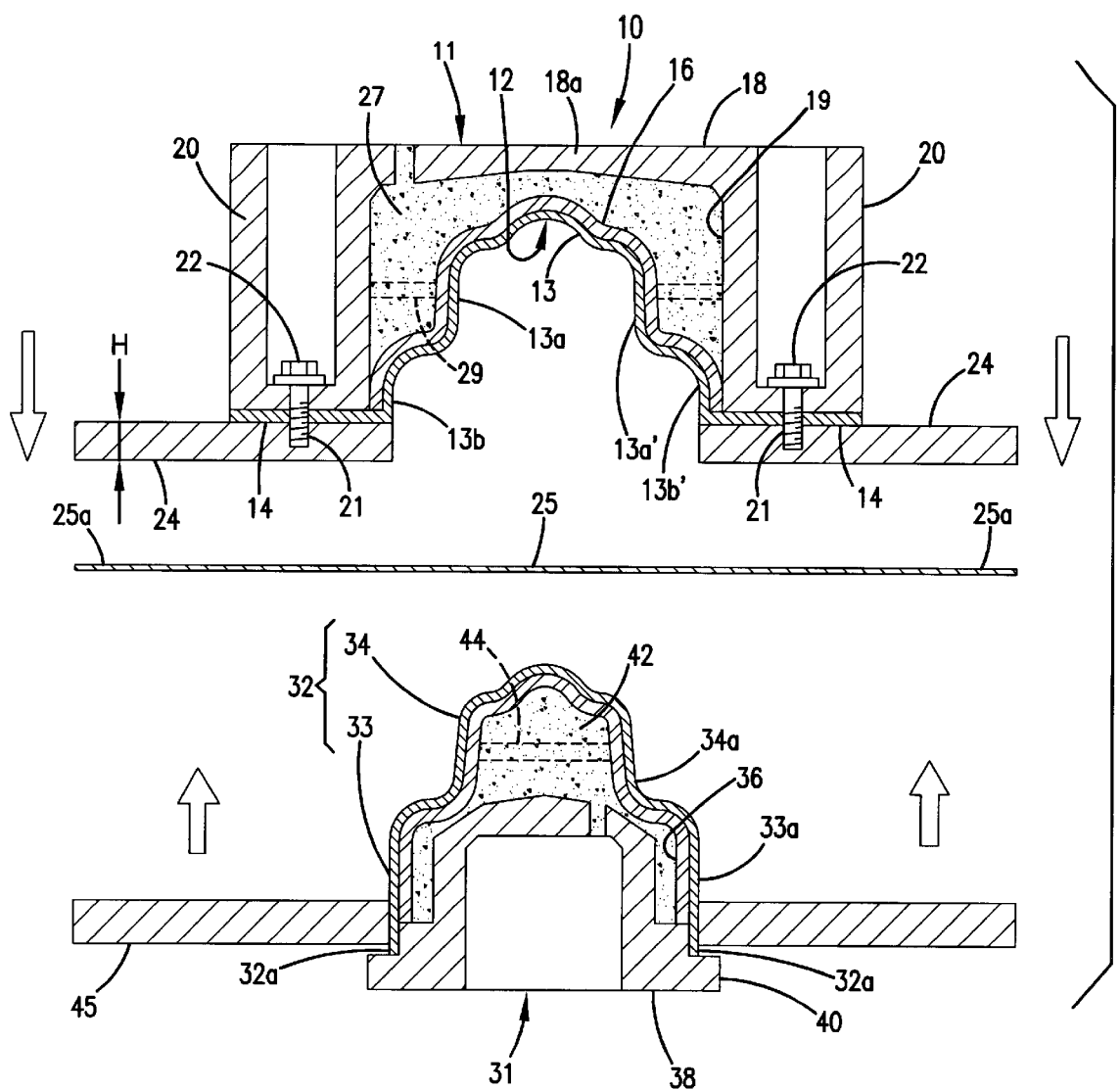
FIG. 1 is a vertical cross-sectional view of a press-forming die assembly produced in accordance with an embodiment of the present invention.

FIG. 1 shows, in vertical cross section, a press-forming die assembly 10 composed of an upper movable die 11 and a lower fixed punch 31. The die 11 is vertically movable toward and away from the punch 31 with a given reciprocating stroke. The die assembly 10 also includes a vertically movable hollow rectangular blank holder 45 disposed around the fixed punch 31 for a purpose described below. In the illustrated embodiment, the die assembly 10 is a drawing die assembly used for drawing a blank sheet 25 into a vehicle component, such as a fuel tank member of a motorcycle.

The die (drawing die) 11 is composed of a die panel 12 press-formed from a sheet material of high-tensile steel or stainless steel (having a thickness of 0.75 mm, for example), a backing material 16 underlying the die panel 12, a frame 18 to which the die panel 12 is attached, a hollow rectangular annular die face 24 secured to the front face of the frame 18 to attach the die panel 12 to the frame 18, and a back-up material 27 such as high-strength cement filled between the frame 18 and the backing material 16.

The die panel 12 has a recessed central portion 13 open downward, and a peripheral flange 14 extending around an open end of the recessed central portion 13. The recessed central portion 13 has a stepped dome-like shape in transverse cross section including a narrow upper part 13a and a wide lower part 13b, each part having two opposed vertical walls 13a', 13b' extending parallel to the direction of movement of the die 11.

The backing material 16 is comprised of a fibre-reinforced water-soluble epoxy resin applied or otherwise coated on the rear surface of the recessed central portion 13 of the die panel 12. In application, a water-soluble epoxy resin is mixed up with short strands of glass fibre by using a mixer, then the mixture is coated on the rear surface of the die panel central portion 13 in a bubble-free state. After the mixture is cured, a fibre-reinforced epoxy resin backing material layer 16 is formed. Since the water-soluble epoxy resin has a high bonding strength and hence can firmly adhere to the rear surface of the die panel 12. In addition, since the front surface of the backing material 16 has undulations following the stepped dome-like configuration of the die panel recessed central portion 13, the backing material 16 exhibits good adhesion to the back-up material 27 (made, for example, of high-strength cement). The backing material 16 applied to the rear surface of the die panel 12 serves as a reinforcement of the die panel 12.

The frame 18 has a recessed central portion 19 for receiving therein the recessed central portion 13 of the die 11. The recessed central portion 19 is defined by and between a flat horizontal top plate 18a and a hollow rectangular vertical leg 20 formed integrally with an outer peripheral edge of the top plate 18a. The leg 20 has a plurality of bolt holes 21 (two being shown) through which a corresponding number of bolts 22 extend.

The hollow rectangular die face 24 is attached by the bolts 22 to the under surface of the leg 20 with the flange 14 firmly gripped between the leg 20 and the die face 24. The die face 24 cooperates with the blank holder 45 to grip or hold a peripheral edge portion 25a of the blank sheet 25 while the blank sheet 25 is pressed or drawn.

The back-up material 27 is made of a cured hydraulic high-strength cement placed to fill up a space between the frame 18 and the backing material 16. The back-up material 27 backs up or supports the die panel 12 from the rear side thereof. The high-strength cement may be replaced by a synthetic resin in which instance a molten synthetic resin is filled between the frame 18 and the backing material 16 and then cooled to cure. Reference numeral 29 denotes positioning strips provided between the frame 18 and the recessed central portion 13 of the die plate 12 to keep the die plate central portion 13 in position against displacement during placement of the high-strength cement (back-up material) 27. After placement of the high-strength cement, the positioning strips 29 serve as a reinforcement of the back-up material 27.

The punch (drawing punch) 31 is comprised of a punch panel 32 press-formed from a blank sheet of high-strength steel or stainless steel (having a thickness of 0.75 mm, for example), a backing material 36 applied to the rear surface of the punch panel 32, a frame 38 to which the punch panel 32 is attached, and a back-up material 42 made of a high-strength cement placed between the frame 38 and the backing material 36.

The punch panel 32 has a shouldered dome-like shape in transverse cross section which is complementary in contour to the shape of the stepped recessed central portion 13 of the die panel 12. Thus, the punch panel 32 has a wide lower part 33 and a narrow upper part 34, each part having two opposed vertical walls 33a; 34a extending parallel to the direction of movement of the drawing die 11.

The backing material 36 is comprised of a fibre-reinforced water-soluble epoxy resin applied or otherwise coated on the rear surface of the punch panel 32 in the same manner as the backing material 16 of the drawing die 11. As previously discussed, since the water-soluble epoxy resin has a high bonding strength and hence can firmly adhere to the rear surface of the punch panel 32. In addition, since the front surface of the backing material 36 has undulations following the shouldered dome-like configuration of the punch panel 32, the backing material 36 exhibits good adhesion to the back-up material 42 (made, for example, of high-strength cement). The backing material 36 applied to the rear surface of the punch panel 32 serves as a reinforcement of the punch panel 32.

The frame 38 has an inverted U shape in transverse cross section including upwardly projecting central portion received in a hollow interior of the dome-shaped punch panel 32. The frame 38 also has a flange 40 on which the punch panel 32 is supported with its lower end 32a being in abutment with an upper surface of the flange 40.

The back-up material 42 is made of a cured hydraulic high-strength cement set or otherwise placed between the frame 38 and the backing material 36. The back-up material 42 backs up or supports the punch panel 32 from the rear side thereof. The high-strength cement may be replaced by a synthetic resin in which instance a molten synthetic resin is filled between the frame 38 and the backing material 36 and then cooled to cure. Reference numeral 44 denotes positioning strips (one being shown) placed in the hollow internal space of the backing material 36 so as to maintain the shape and dimensions of the punch panel 32 during placement of the high-strength cement between the backing material 36 and the frame 38. After placement of the high-strength cement, the positioning strips 44 serve as a reinforcement of the punch panel 32 and backing material 36.

The hollow-rectangular blank holder 45 is vertically movably disposed around the drawing punch 31 in confronting relation to the die face 24 of the drawing die 11. In a drawing operation, the blank holder 45 cooperates with the die face 24 to grip or hold the peripheral portion 25a of the blank sheet 25 so as to prevent generation of wrinkles on any part of the blank sheet 25 being drawn.

In the drawing die assembly 10, the die panel 12 and the punch panel 32 are both formed by press working. This enables the use of a sheet metal with high surface hardness, such as high-strength steel or stainless steel, in forming the die and punch panels 12 and 32. The die and punch panels 12 and 32 thus press-formed from such sheet metal have highly durable working surfaces with the result that the drawing die 11 and punch 31 as a whole have good durability.

Furthermore, the die panel 12 and the punch panel 32 both made of metal can be plated or otherwise coated with a layer of hard chromium when a higher surface hardness is needed. The cement and synthetic resin that can be used to form the back-up materials 27, 42 are relatively inexpensive and hence do not increase the manufacturing cost of the drawing die 11 and punch 31.

The drawing die assembly 10 operates as follows. The upper die 11 is normally disposed in its uppermost standby position. The blank holder 45 is moved upward until an upper surface of the blank holder 45 is in flash with the top of the punch plate 32. After a blank sheet 25 is placed on the blank holder 45, the die 11 is descended toward the punch 31. Downward movement of the die 11 first causes a peripheral portion 25a of the blank sheet 25 to be gripped by and between the die face 24 and the blank holder 45. As the downward movement of the die 11 continues, the material of a central portion of the blank sheet 25 is deformed or otherwise drawn by and between the die panel 12 and the punch panel 32 while the peripheral portion 25a is continuously gripped. When the die 11 reaches its lowermost working position, the material of the central blank sheet portion has been drawn into a shape complementary in contour to the shape of a cavity defined between the die panel 12 and the punch panel 32.

Figure 2:
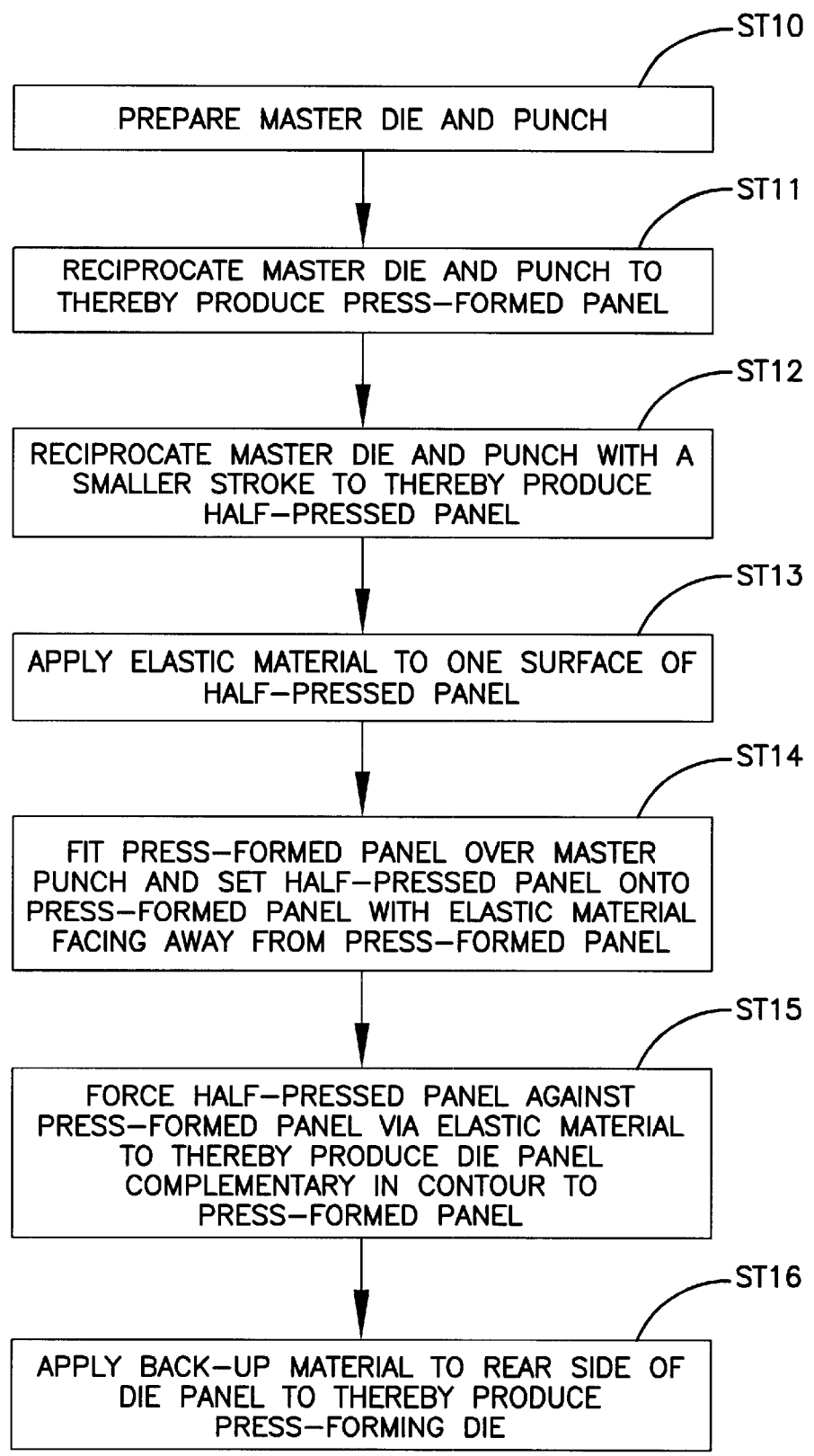
FIG. 2 is a flowchart showing a sequence of operations achieved to produce a press-forming die of the die assembly according to the present invention.

Then, a method of producing the drawing die assembly 10 shown in FIG. 1 will be described with reference to FIGS. 2 to 18. Referring now to FIG. 2, there is shown a flowchart illustrative of a sequence of operations achieved to produce the die 11 of the drawing die assembly 10.

Figure 3A:
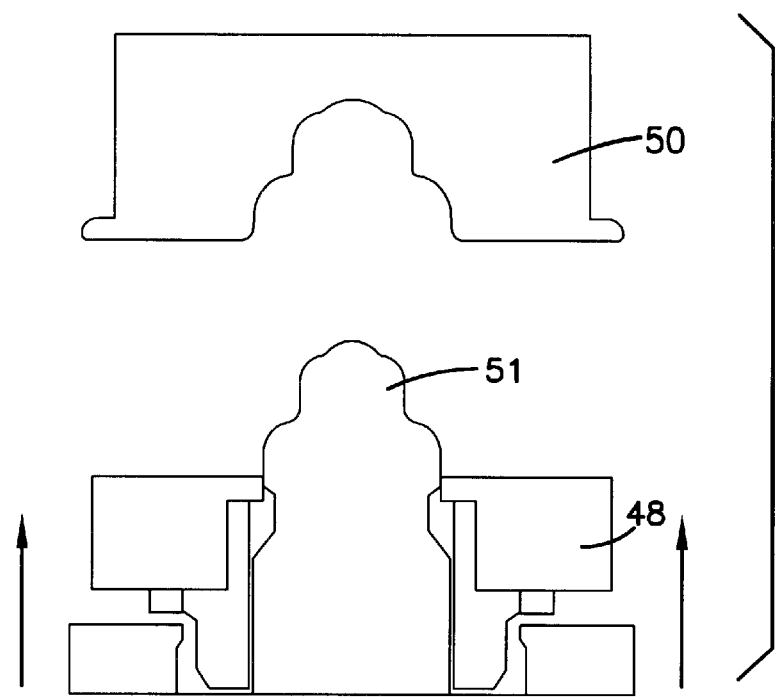
FIGS. 3A to 4B are diagrammatical views illustrative of the manner in which a first blank sheet is press-formed into a press-formed panel by and between a master die and a muster punch.

At a first step (ST10), a master die 50 and a master punch 51 are prepared, as shown in FIG. 3A. The master die 50 and master punch 51 jointly define therebetween a die cavity complementary in contour to the shape of a punch panel 32 (FIG. 1) to be produced. The master punch 51 is associated with a vertically movable blank holder 48. Though not shown, the master die 50 is attached to the ram of a press machine and the master punch 51 and the blank holder 48 are set on the table of the press machine below the master die 50. The master die 50 and the master punch 51 are formed from a relatively soft material such as ZAS, or synthetic resin. Use of such material facilitates easy manufacture of the master die 50 and punch 51.

Figure 3B:
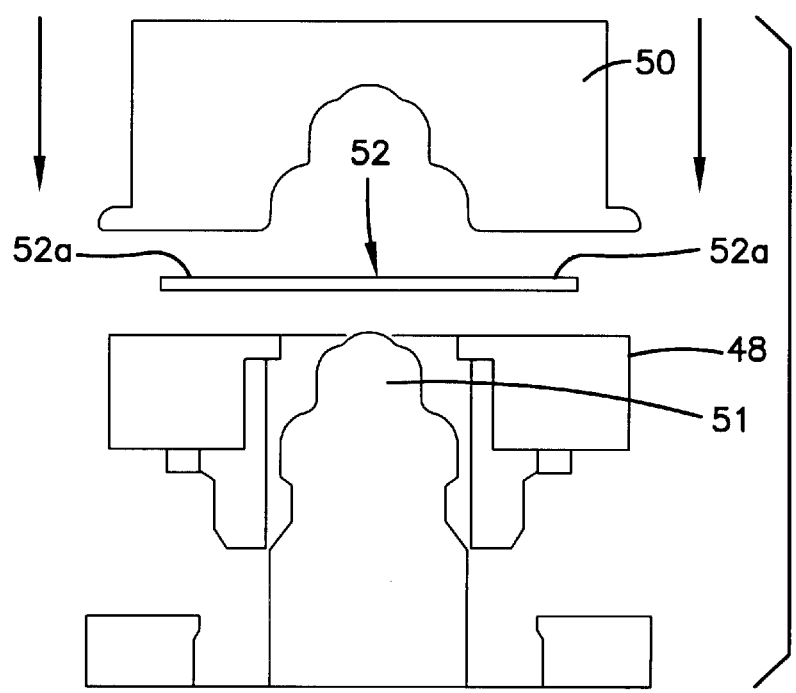
Figure 4A:
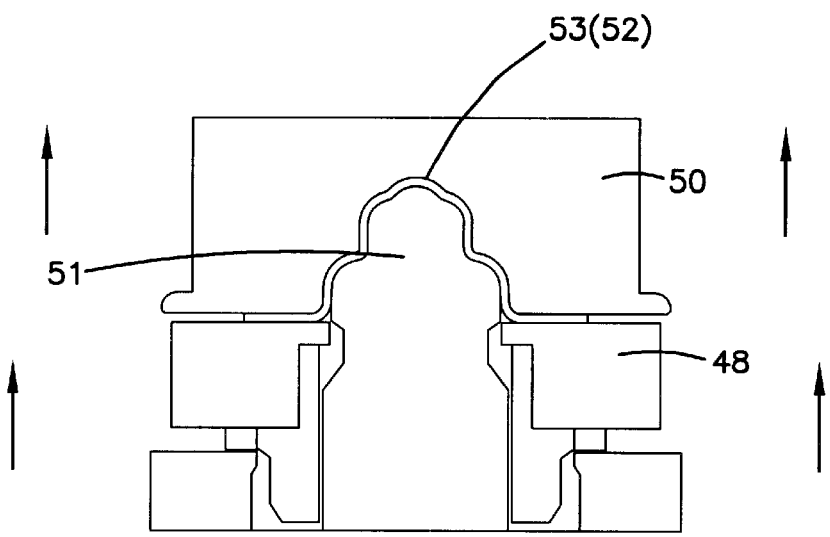
Figure 4B:
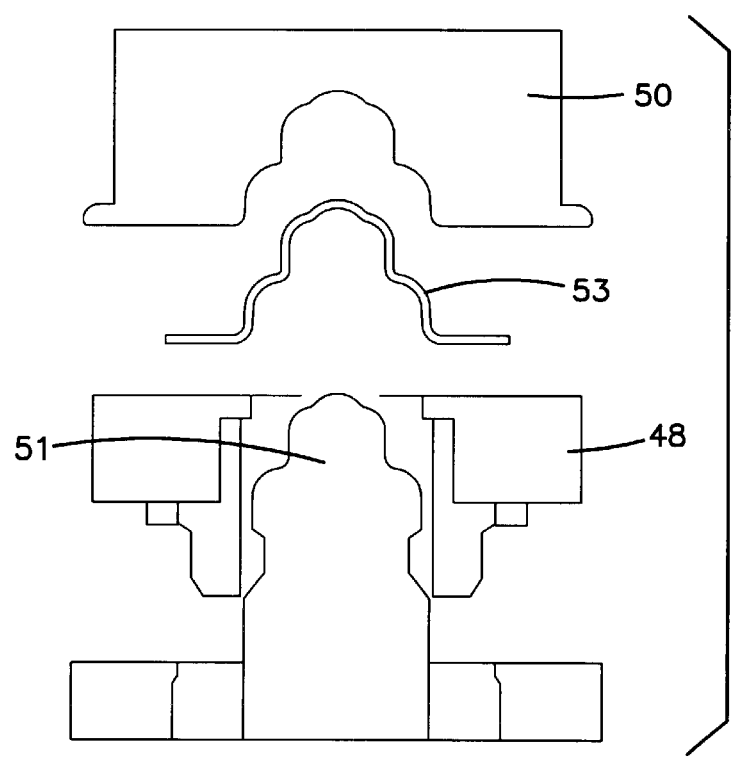

Subsequently, at a second step (ST11 shown in FIG. 2), the blank holder 48 moves upward to an operating position, as shown in FIG. 3B. After a first blank sheet 52 is placed between the master die 50 and the master punch 51, the master die 50 is descended toward the master punch 51 so that the blank sheet 52 is press-formed into a press-formed panel 53 by and between the master die 50 and punch 51 with the peripheral portion 52a being gripped between the blank holder 48 and the die face 24 (FIG. 1), as shown in FIG. 4A. Then, after the master die 50 and the blank holder 48 are ascended, the press-formed panel 53 is removed from the press machine, as shown in FIG. 4B.

Figure 5A:
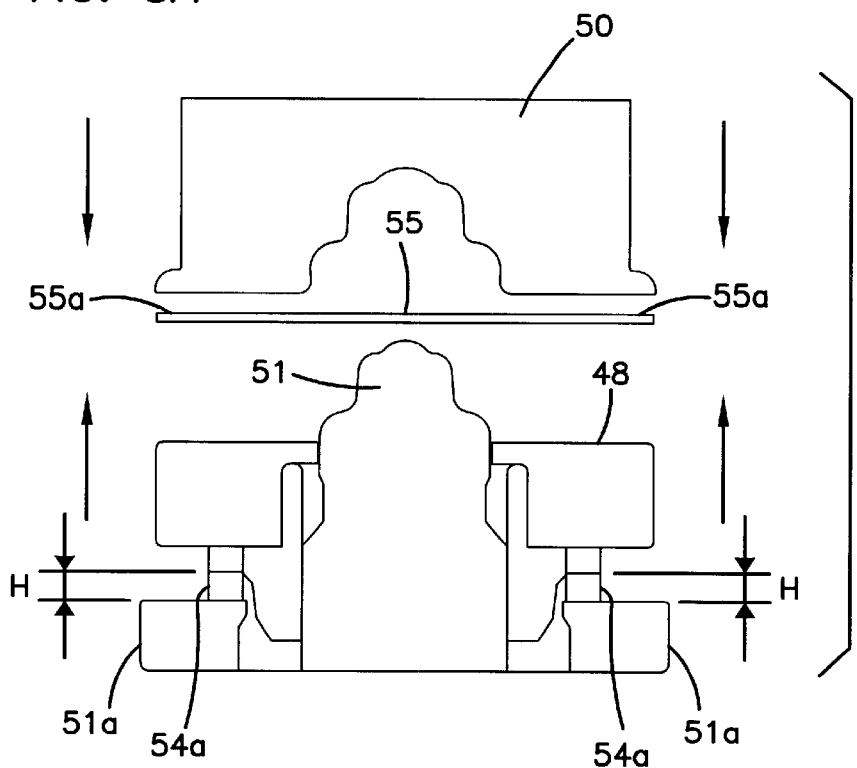
FIGS. 5A and 5B are diagrammatical views illustrative of the manner in which a second blank sheet is press-formed into a half-pressed panel by and between the master die and punch.

At a third step (ST12 shown in FIG. 2), spacer blocks 54a are disposed between a base portion 51a of the master punch 51 and the blank holder 48, as shown in FIG. 5A. The spacer blocks 54a have the same thickness H as the die face 24 (FIG. 1).

Figure 5B:
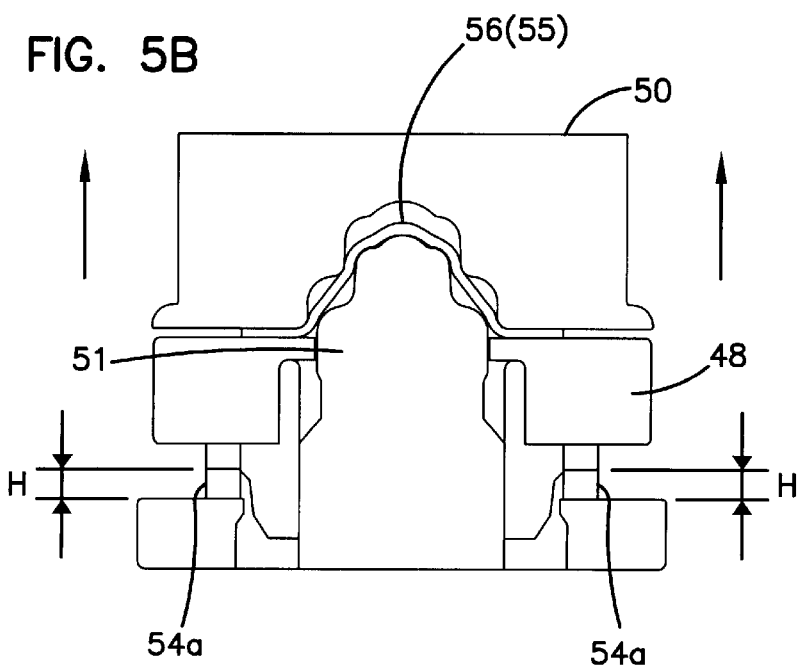
Figure 6A:
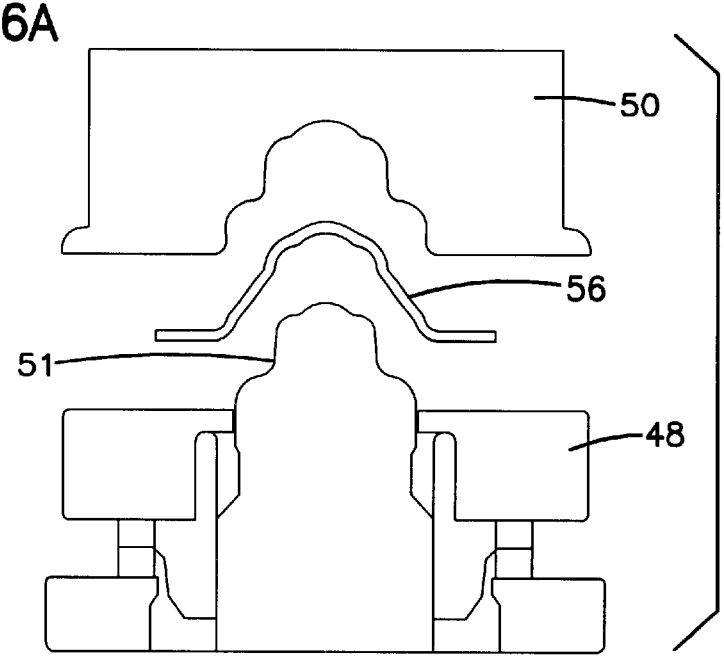
FIGS. 6A to 6C are diagrammatical views illustrative of the manner in which an elastic material is applied to one surface of the half-pressed panel which has situated in face to face with the mater die.

Then, a second blank sheet 55 is placed between the master die 50 and the master punch 51, and the blank holder 48 is moved upward as indicated by the arrow in FIG. 5A. Subsequently, the master die 50 is lowered toward the master punch 51 to thereby press-form the second blank sheet 55 into a half-press panel 56 with a peripheral portion 55a of the second blank sheet 55 being gripped between the blank holder 48 and the die face 24 (FIG. 1), as shown in FIG. 5B. In this instance, due to the presence of the spacer blocks 54a, the downward stroke of the master die 50 is smaller than that in the press-forming operation achieved when the press-formed panel 53 is produced. By thus decreasing the downward stroke of the master die 50, the degree of plastic deformation of the press-formed panel 56 is smaller than that of the press-formed panel 53 to such an extent corresponding to the thickness H of the spacer blocks 54a and die face 24 (FIG. 1). Then, after the master die 50 and the blank holder 48 are ascended, the half-pressed panel 56 is removed, as shown in FIG. 6A.

Figure 6B:
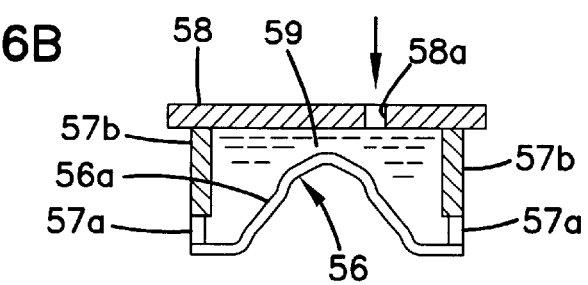
Figure 6C:
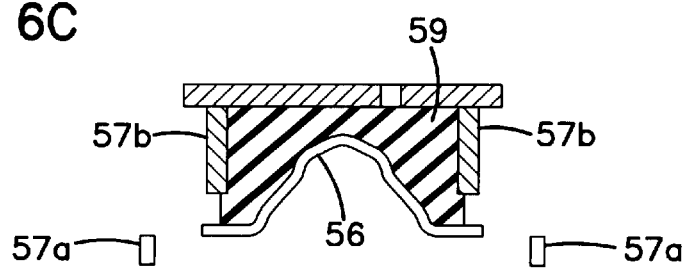

Subsequently, at a third step (ST13 shown in FIG. 2), blocks 57a are arranged along a peripheral edge of one surface of the half-pressed panel 56, which surface has faced the master die 50 at the preceding step ST12. Then, a hollow frame 57b is set on the blocks 57a, and a cover plate 58 is placed on the frame 57b. Thus, a hollow space is defined between the half-pressed panel 56 and the blocks 57a, frame 57b and cover plate 58. The cover plate 58 has an opening 58a. From the opening 58a, a resilient material such as urethane rubber is poured in the liquid state into the space provided behind the half-pressed panel 56, as shown in FIG. 6B. After the elastic material 59 is cured, the blocks 57a are removed, as shown in FIG. 6C. In this instance, due to the resiliency of the half-pressed panel 56, the half-pressed panel 56 and the elastic material 59 are held integral with each other.

Figure 7A:
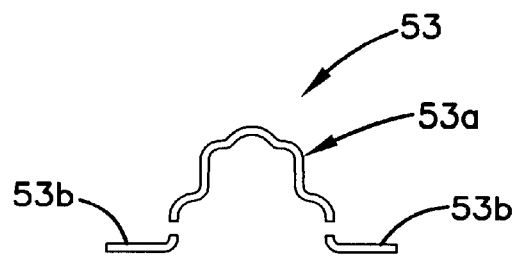
FIGS. 7A to 8B are diagrammatical views illustrative of the manner in which the half-pressed panel is shaped into a die panel complementary in contour to the shape of the press-formed panel.

Thereafter, at a fourth step (ST14 shown in FIG. 2), a peripheral flange 53b of the press-formed panel 53 is removed by cutting, as shown in FIG. 7A. A press-formed panel 53a is thus formed.

Figure 7B:
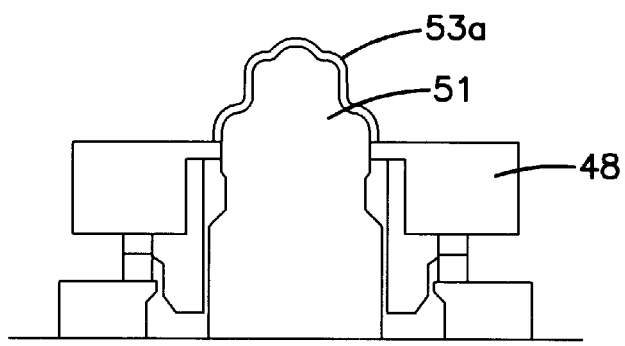
Figure 7C:
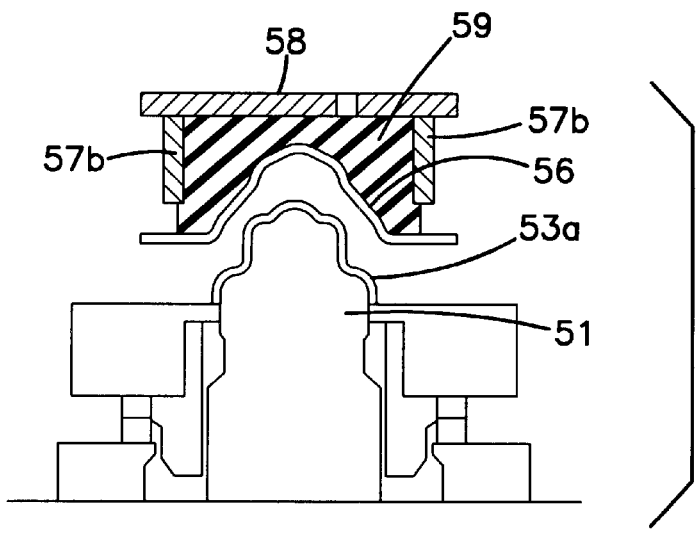

The press-formed panel 53a is then fitted over the master punch 51, as shown in FIG. 7B. After that, the half-pressed panel 56 integrally connected with the cover plate 58 via the elastic material 59 is placed over the press-formed panel 53a, with the elastic material 59 facing away from the press-formed panel 53a, as shown in FIG. 7C.

Figure 8A:
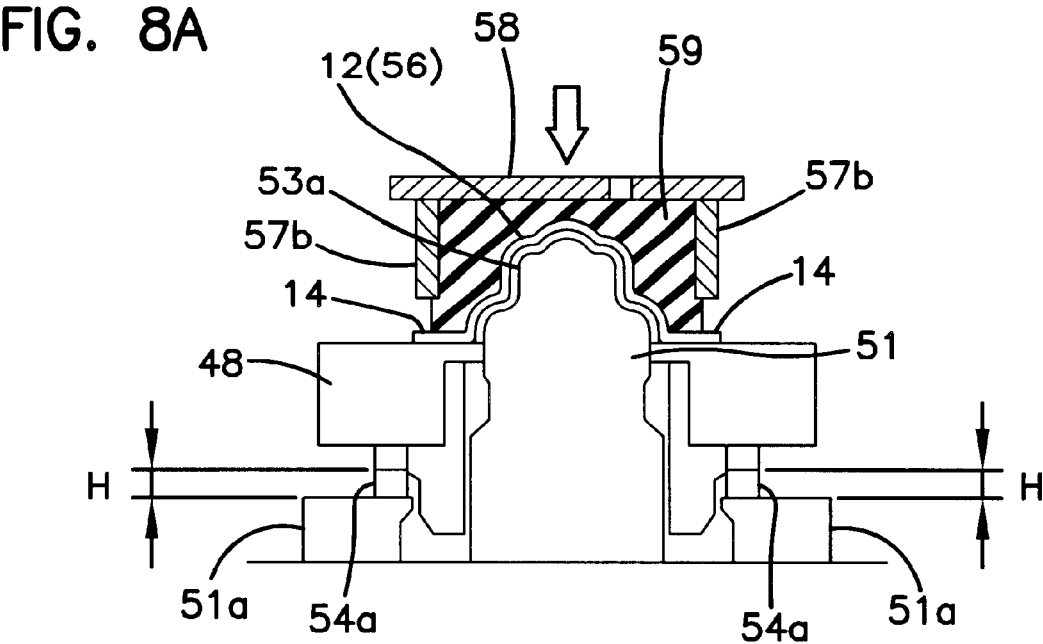

Then, at a fifth step (ST15 shown in FIG. 2), the ram (not shown) of the press machine is lowered to depress the cover plate 58, thereby forcing the half-pressed panel 56 against the press-formed panel 53a via the elastic material 59, as shown in FIG. 8A. During that time, the elastic material is sufficiently deformable to secure the desired amount of plastic deformation of the half-pressed panel 56 because it is not confined by the blocks 57a (FIG. 6B). By thus forcing the half-pressed panel 56 against the press-formed panel 53a via the elastic material 59, the half-pressed panel 56 is shaped into a profile complementary to that of the press-formed panel 53a. The thus profiled press-formed panel 56 forms a die panel 12.

In this instance, because the spacer blocks 54a having the same thickness as the die face 24 (FIG. 1) are disposed between the base portion 51a of the master punch 51 and the blank holder 48, the height or depth of the die panel 12 is smaller than the height of the press-formed panel 53a by the thickness of the die face 24. Thus, a peripheral flange 14 of the die panel 12 can be placed on an upper surface of the die face 24, as shown in FIG. 1.

Figure 8B:
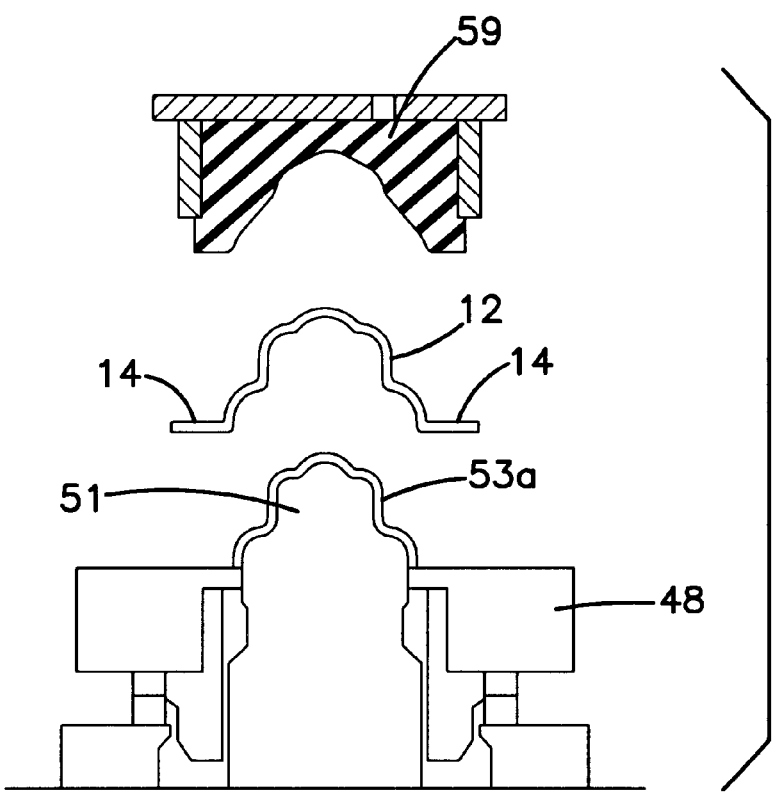

Then, the ram of the press machine is ascended, and after the elastic material 59 is moved upward away from the die panel 12, the die panel 12 is removed, as shown in FIG. 8B.

The thus formed die panel 12 is complementary in contour to the shape of the press-formed panel 53a. The half-pressed panel 56, as it is deformed to assume the profile of the press-formed panel 53a, is subjected to a pressure or force distributed uniformly over the entire surface of the half-pressed panel 56. To this end, for a master die having a vertical wall extending parallel to the axis of movement of the master die, it is preferable that the elasticity of the elastic material is more than two times of the thickness of the panel 56 (blank sheet 52).

Figure 9A:
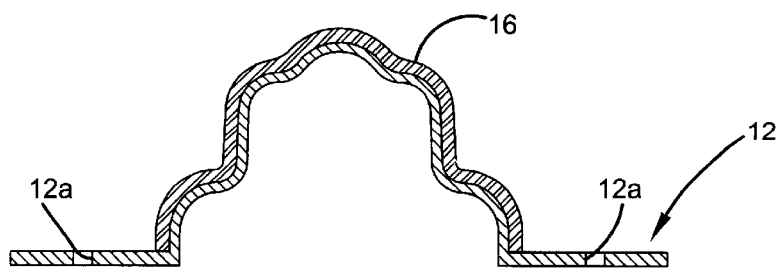
FIGS. 9A to 9C are vertical cross-sectional views showing the manner in which a back-up material is applied to the rear surface of the die panel, thereby producing a press-forming die.
Figure 9B:
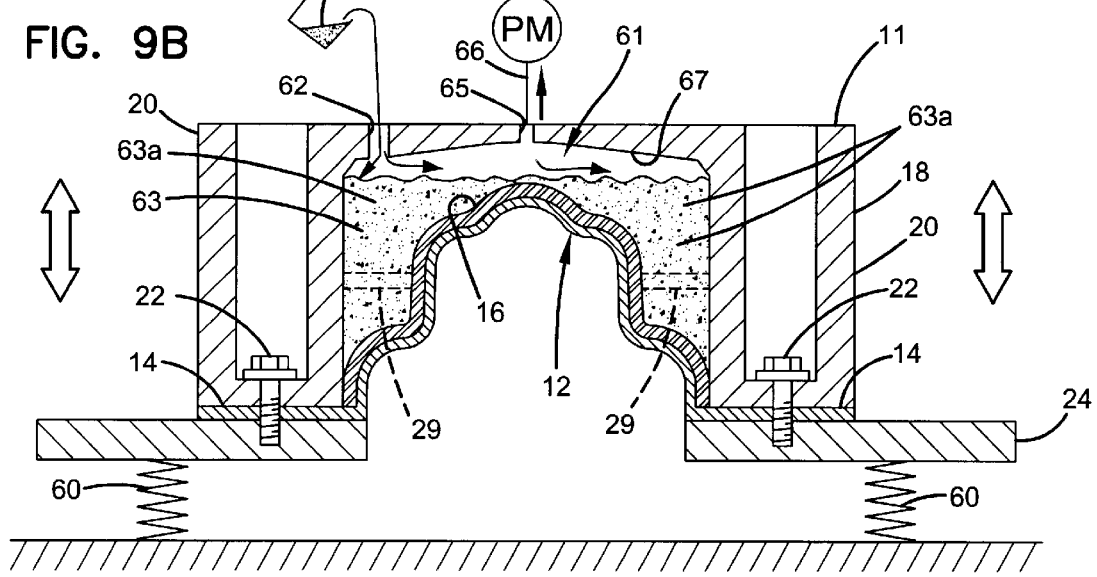
Figure 19A:
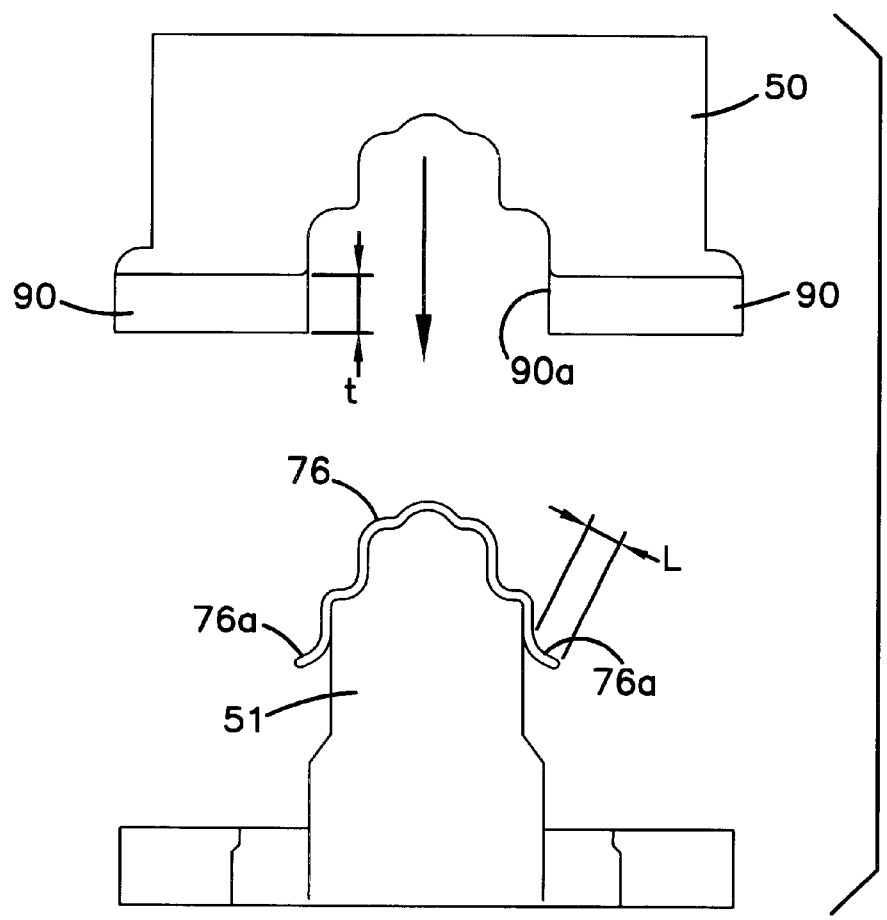
FIGS. 19A and 19B are diagrammatical views showing a modification of the shaping process shown in FIGS. 16A–16E.

A Subsequently, at a sixth step (ST16 shown in FIG. 2), holes 12a are formed in a flange 14, and a backing material 16 is applied to the rear surface a the die panel 12, as shown in FIG. 19A. The die panel 12 is set on the frame 18 with the flange 14 being gripped between the leg 20 of the frame and the die face 24, and the die face 24 is fastened by the bolts 22 to the leg 20. The die panel 12 is thus attached to the frame 18, as shown in FIG. 9B. Thereafter, positioning and reinforcing strips 29 are attached between the frame 19 and the die panel 12. After the frame 18 and the die panel 12 held therein are placed on a vibrator (schematically illustrated in the form of springs) 60, the vibrator 60 is driven to vertically shake or oscillate the frame 18 and the die panel 1. While keeping this condition, a slurry of high-strength cement 63 is set or placed in a space 61 defined between the frame 18 and the die panel 12 (backing material 16). To this end, the frame 18 has an opening 62 from which the cement slurry 63 is supplied. While the cement slurry 63 is placed, the positioning and reinforcing strips 29 keep the die panel 12 in position against displacement relative to the frame 18.

The high-strength cement slurry 63 is preferably a mixture of high-strength cement, metal fiber and water reducing agent homogeneously mixed up in a vacuum mixer (not shown) at the ratio of 100:10:5. The metal fiber increases the strength of the high-strength cement 63, and the water reducing agent can speed up the solidification of the cement 63. Additionally, the metal fiber and water reducing agent can diminish contraction of the cement while being solidified.

Simultaneous with placing of the high-strength cement slurry 63 into the space 61, a vacuum pump 64 (FIG. 9B) is driven to remove babbles 63a from the high-strength cement 63.

By driving the vacuum pump 64, the space 61 is evacuated so that air babbles 63a contained in the cement slurry 63 are drawn into the space 61. In this instance, vertical vibration applied from the vibrator 60 through the frame 18 and die panel 12 to the cement slurry 63 being placed promotes separation of the air babbles 63a from the cement slurry 63. The combination of the vacuum action and vibratory movement insures complete deaeration of the cement slurry 63.

Air collected in the space 61 is socked through an outlet 65 and a conduit 66 into the vacuum pump 64 and discharged to the outside air. During that time, air inside the space 61 is smoothly guided into the outlet 65 because a conical upper inside surface 67 of the frame 18 is shaped to converge to the outlet 65. This improves the evacuation efficiency.

Figure 9C:
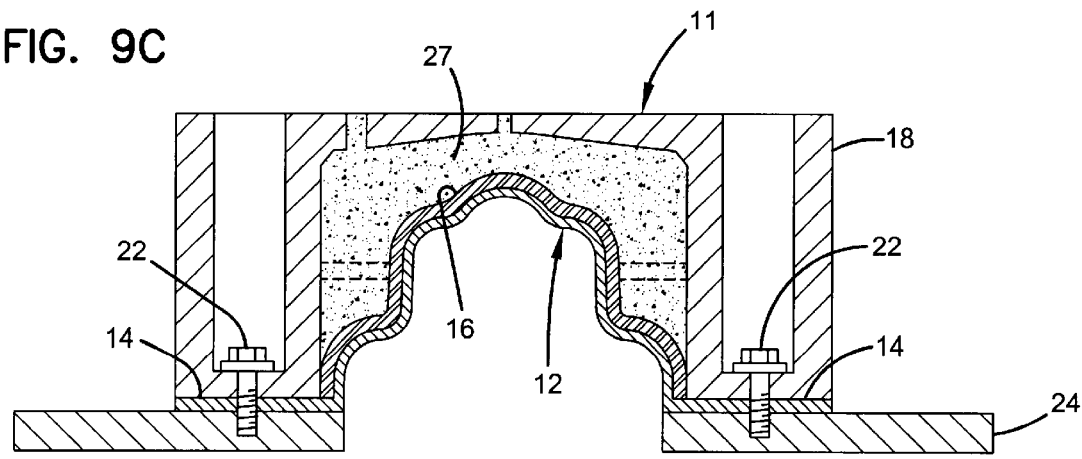

When the high-strength cement 63 (FIG. 9B) placed in the space 61 is solidified, a back-up material 27 is formed, as shown in FIG. 9C. A press-forming die 11 is thus produced.

Since the high-strength cement 63 being placed is deaerated, the back-up material 27 is completely free from cavities and hence has high durability. This increases the durability of the press-forming die 11 as a whole.

According to the method as described above, when the half-pressed panel 56 is forced against the press-formed panel 53a via the elastic material 59, the elastic material 59 elastically deforms to assume the profile of the half-pressed panel 56. This ensures that the half-pressed panel 56 is forced by a pressure or force distributed uniformly over the entire surface of the half-pressed panel 56. With this uniform pressure distribution, the half-pressed panel 56 is shaped into a die panel 12 which is complementary in contour to the shape of the press-formed panel 53a. The die panel 12 forms a working surface of the press-forming die 11. It will be appreciated that the press-forming die 11 can be easily produced as compared by the conventional die because the working surface thereof does not require a conventional cutting process as done on a numerically controlled working machine or a profiling machine.

Figure 10:
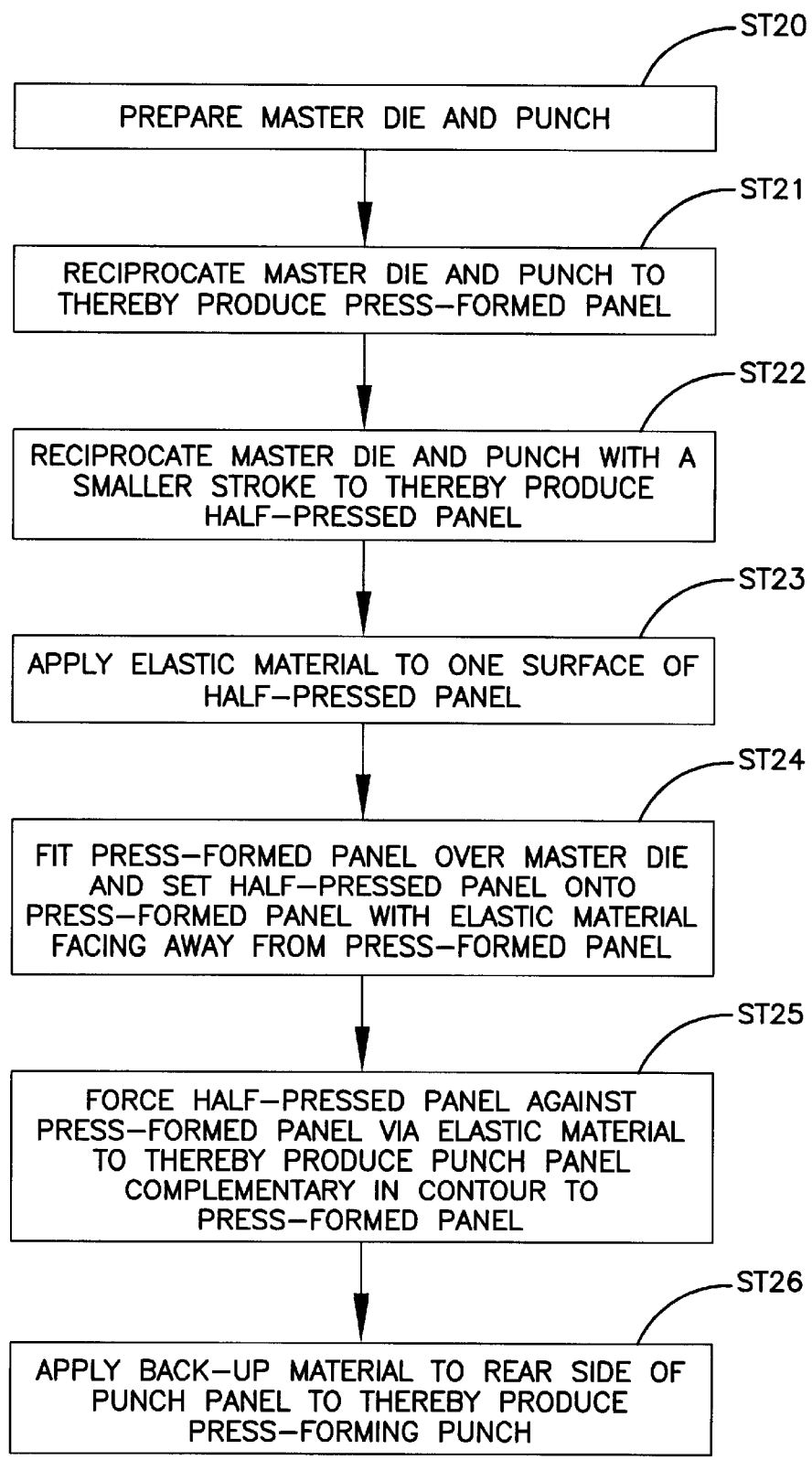
FIG. 10 is a flowchart showing a sequence of operations achieved to produce a press-forming punch according to the present invention.

The press-forming punch 31 of the drawing die assembly 10 is produced according to a method as schematically shown in the flowchart shown in FIG. 10.

Figure 11A:
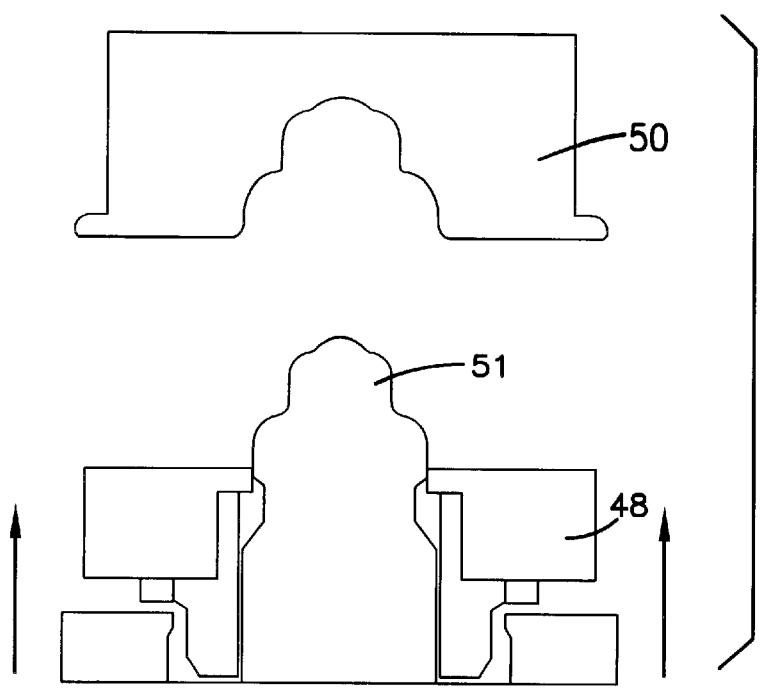
FIGS. 11A to 12B are diagrammatical views illustrative of the manner in which a first blank material is press-formed into a press-formed panel by and between the master die and punch.

At a first step (ST20), a master die 50 and a master punch 51 are prepared, as shown in FIG. 11A. The master die 50 and master punch 51 jointly define therebetween a die cavity complementary in contour to the shape of a die panel 12 (FIG. 1) to be produced. The master punch 51 is associated with a vertically movable blank holder 48. Though not shown, the master die 50 is attached to the ram of a press machine and the master punch 51 and the blank holder 48 are set on the table of the press machine below the master die 50. The master die 50 and the master punch 51 are formed from a relatively soft material such as ZAS, or synthetic resin. Use of such material facilitates easy manufacture of the master die and punch 50 and 51.

Figure 11B:
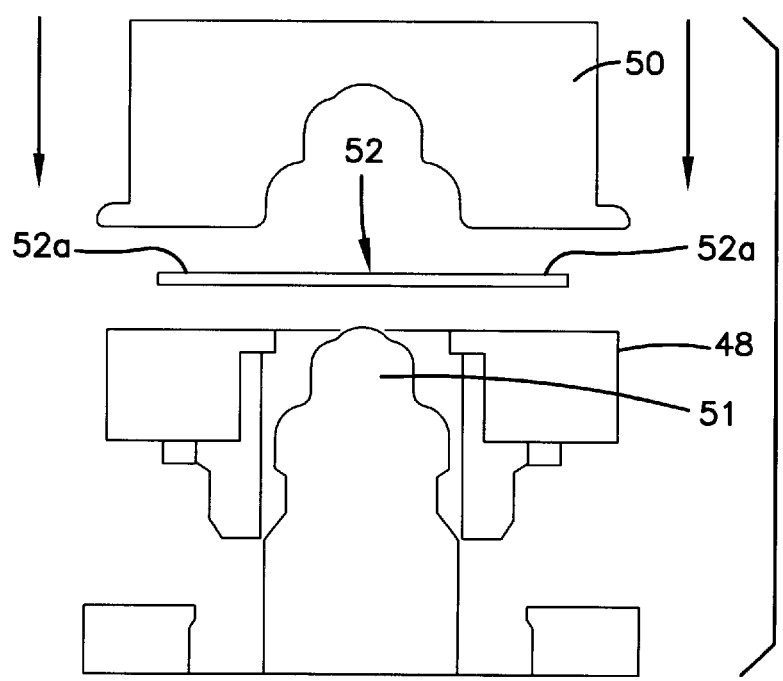
Figure 12A:
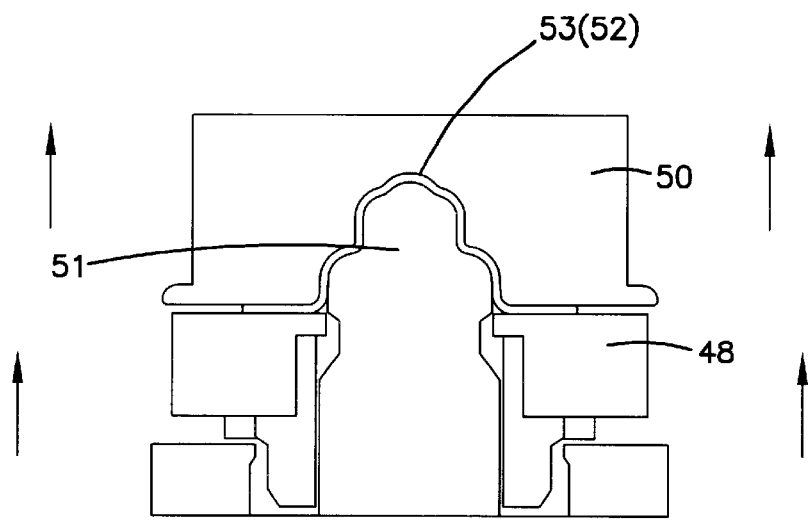
Figure 12B:
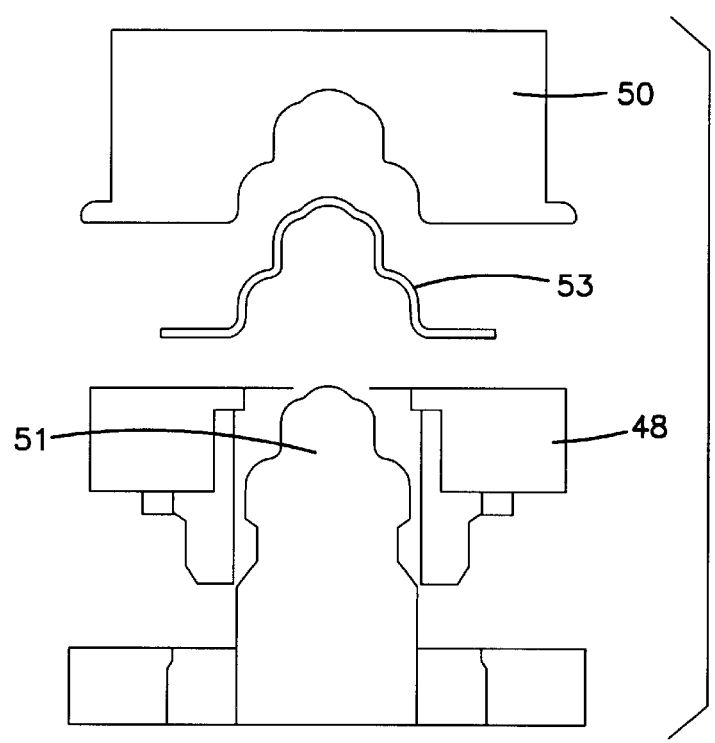

Subsequently, at a second step (ST21 shown in FIG. 10), the blank holder 48 moves upward to an operating position, as shown in FIG. 11B. After a first blank sheet 52 is placed between the master die 50 and the master punch 51, the master die 50 is descended toward the master punch 51 so that the blank sheet 52 is press-formed into a press-formed panel 53 by and between the master die 50 and punch 51 with the peripheral portion 52a being gripped between the blank holder 48 and the die face 24 (FIG. 1), as shown in FIG. 12A. Then, after the master die 50 and the blank holder 48 are ascended, the press-formed panel 53 is removed from the press machine, as shown in FIG. 12B.

Figure 13A:
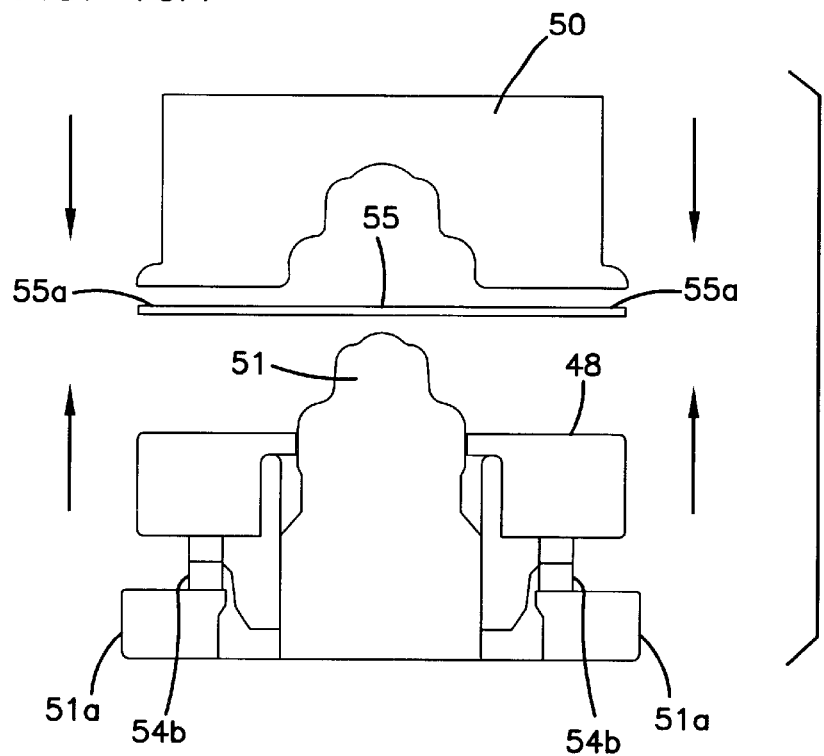
FIGS. 13A and 13B are diagrammatical views illustrative of the manner in which a second blank material is press-formed into a half-pressed panel by and between the master die and punch.

At a third step (ST22 shown in FIG. 10), spacer blocks 54b are disposed between a base portion 51a of the master punch 51 and the blank holder 48, as shown in FIG. 13A.

Figure 13B:
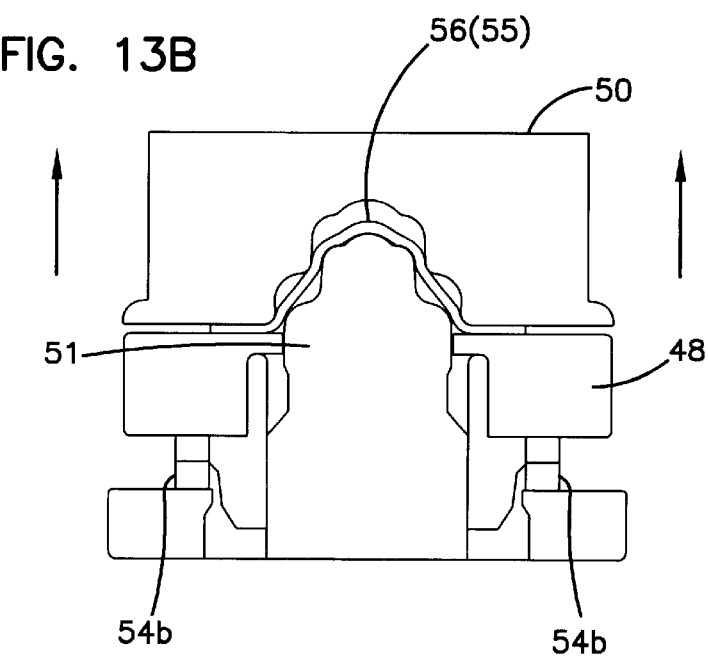
Figure 14A:
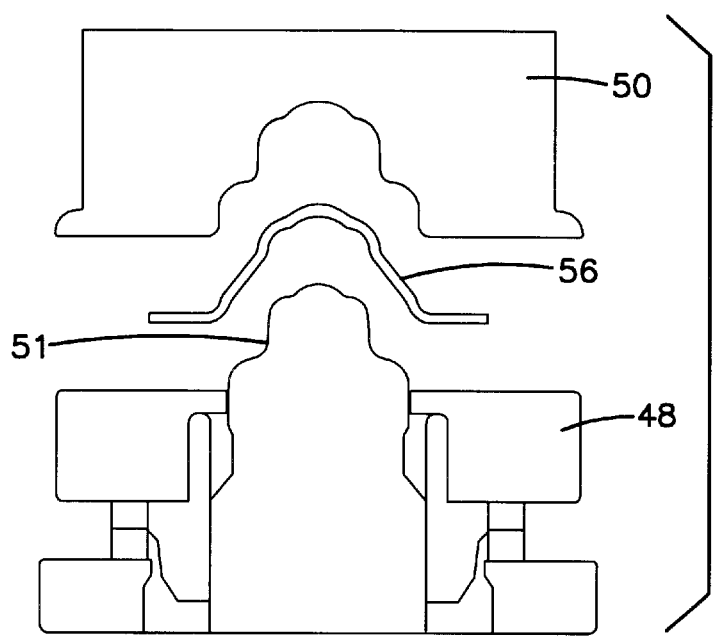
FIGS. 14A to 14C are diagrammatical views illustrative of the manner in which an elastic material is applied to one surface of the half-pressed panel which has been situated in face to face with the master punch.

Then, a second blank sheet 55 is placed between the master die 50 and the master punch 51, and the blank holder 48 is moved upward as indicated by the arrow in FIG. 13A. Subsequently, the master die 50 is lowered toward the master punch 51 to thereby press-form the second blank sheet 55 into a half-press panel 56 with a peripheral portion 55a of the second blank sheet 55 being gripped between the blank holder 48 20 and the die face 24 (FIG. 1), as shown in FIG. 13B. In this instance, due to the presence of the spacer blocks 54b, the downward stroke of the master die 50 is smaller than that in the press-forming operation achieved when the press-formed panel 53 is produced. By thus decreasing the downward stroke of the master die 50, the degree of plastic deformation of the press-formed panel 56 is smaller than that of the press-formed panel 53 to such an extent corresponding to the thickness H of the spacer blocks 54b. Then, after the master die 50 and the blank holder 48 are ascended, the half-pressed panel 56 is removed, as shown in FIG. 14A.

Figure 14B:
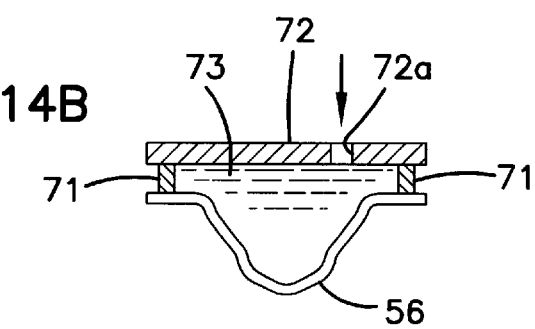
Figure 14C:
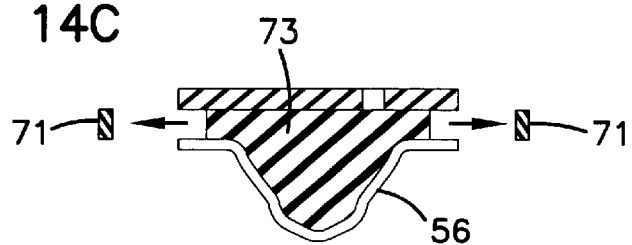

Subsequently, at a fourth step (ST23 shown in FIG. 10), the half-pressed panel 56 is reversed, and blocks 71 are arranged along a peripheral edge of one surface 56a of the half-pressed panel 56, which surface has been situated in face to face with the master punch 51 at the preceding step ST22. Then, a cover plate 72 having a supply opening 72a is placed on the blocks 71. Thus, a hollow space is defined between the half-pressed panel 56, blocks 71, and cover plate 72. From the opening 72a, a resilient material 73 such as urethane rubber is poured in the liquid state into the space provided behind the half-pressed panel 56, as shown in FIG. 14B. After the elastic material 73 is cured, the blocks 71 are removed, as shown in FIG. 14C. In this instance, due to the resiliency of the half-pressed panel 56, the half-pressed panel 56 and the elastic material 73 are held integral with each other.

Figure 15A:
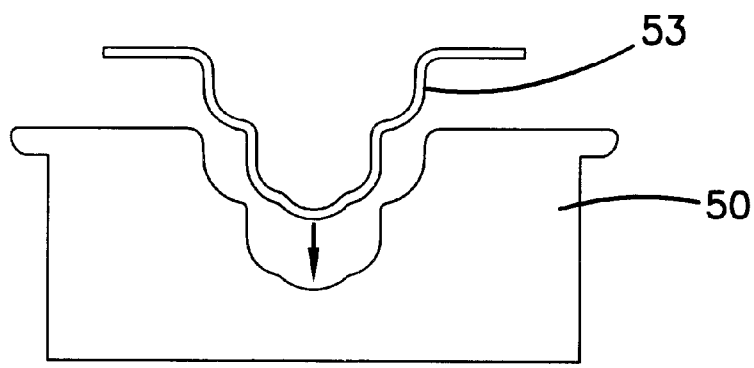
FIGS. 15A to 16E are diagrammatical views illustrative of the manner in which the half-pressed panel is shaped into a punch panel complementary in contour to the shape of the press-formed panel.
Figure 15B:
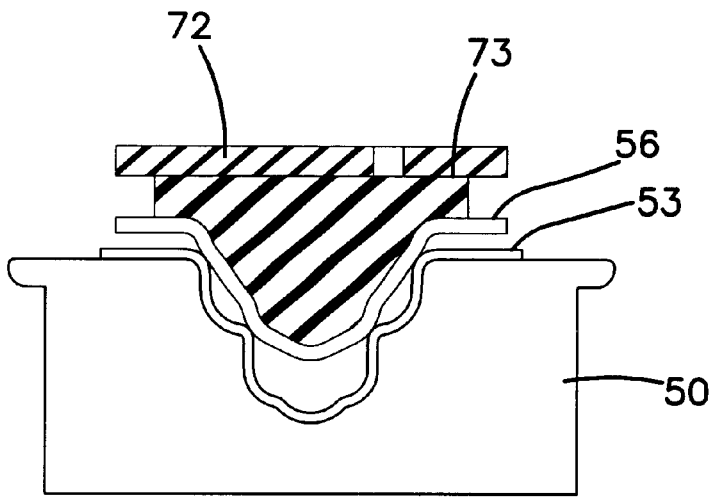

Thereafter, at a fifth step (ST24 shown in FIG. 10), the master die 50 is placed on a fixed table with its cavity open upward, as shown in FIG. 15A. After the press-formed panel 53 is fitted in the master die 50, the half-pressed panel 56 integrally connected with the cover plate 72 via the elastic material 73 is placed over the press-formed panel 53, with the elastic material 73 facing away from the press-formed panel 53, as shown in FIG. 15B.

Figure 16A:
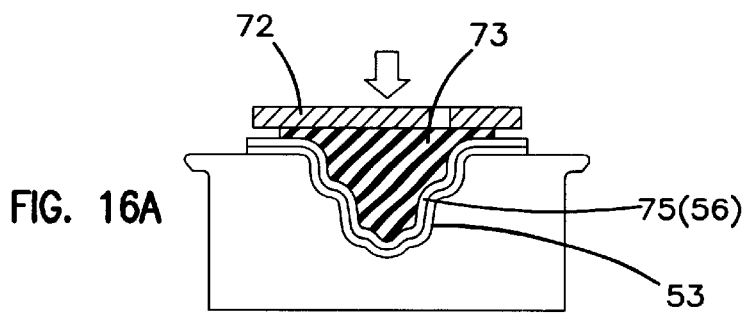

Then, at a sixth step (ST25 shown in FIG. 10), the ram (not shown) of the press machine is lowered to depress the cover plate 72, thereby forcing the half-pressed panel 56 against the press-formed panel 53 via the elastic material 73, as shown in FIG. 16A. During that time, the elastic material is sufficiently deformable to secure the desired amount of plastic deformation of the half-pressed panel 56 because it is not confined by the blocks 71 (FIG. 14B). By thus forcing the half-pressed panel 56 against the press-formed panel 53 via the elastic material 73, the half-pressed panel 56 is shaped into a profile complementary to that of the press-formed panel 53. The thus profiled press-formed panel 56 forms a punch panel blank 75.

Figure 16B:
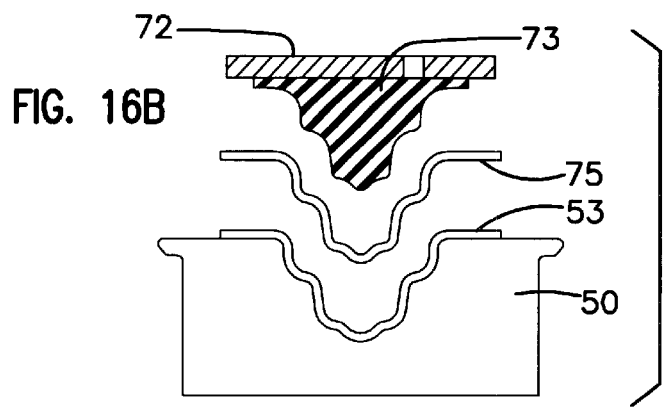

Then, the ram of the press machine is ascended, and after the elastic material 73 is moved upward away from the punch panel blank 75, the punch panel blank 75 is removed, as shown in FIG. 16B.

Figure 16C:
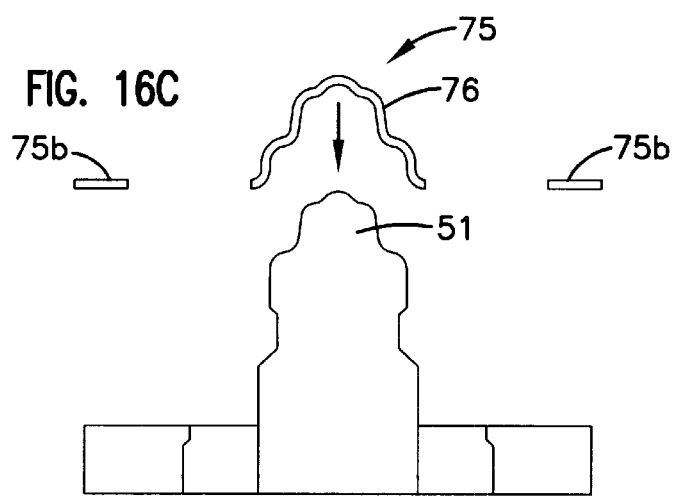

Subsequently, a flange 75b of the punch panel blank 75 is removed by die-cutting, for example, as shown in FIG. 16C, whereby a secondary punch panel blank 76 is obtained.

Figure 16D:
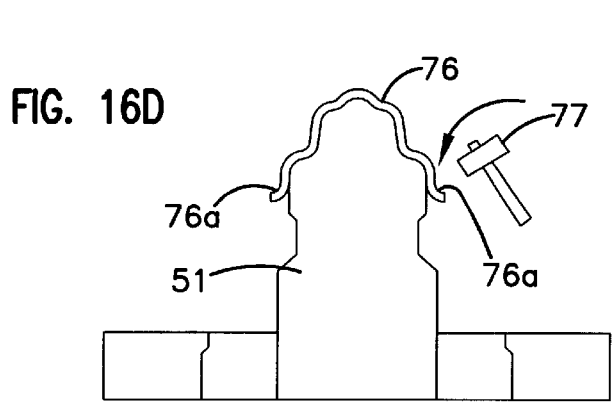
Figure 16E:
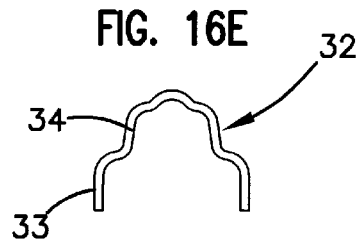

Thereafter, a working surface of the master punch 51 is thinned or removed by cutting to an extent equal to the thickness of the punch panel blank 76. Then, after the secondary punch panel blank 76 is fitted over the thinned working surface of the master punch 51, an outwardly projecting lower edge 76a of the punch panel blank 76 is made parallel to a vertically extending portion of the working surface by using a suitable tool such as hammer 77, as shown in FIG. 16D. A punch panel 32 is thus produced, as shown in FIG. 16D.

The half-pressed panel 56, as it is deformed to assume the profile of the press-formed panel 53, is subjected to a pressure or force distributed uniformly over the entire surface of the half-pressed panel 56. To this end, for a master punch having a vertical wall extending parallel to the axis of movement of the master punch, it is preferable that the elasticity of the elastic material 73 is more than two times of the thickness of the half-pressed panel 56 (blank sheet 52).

Figure 17A:
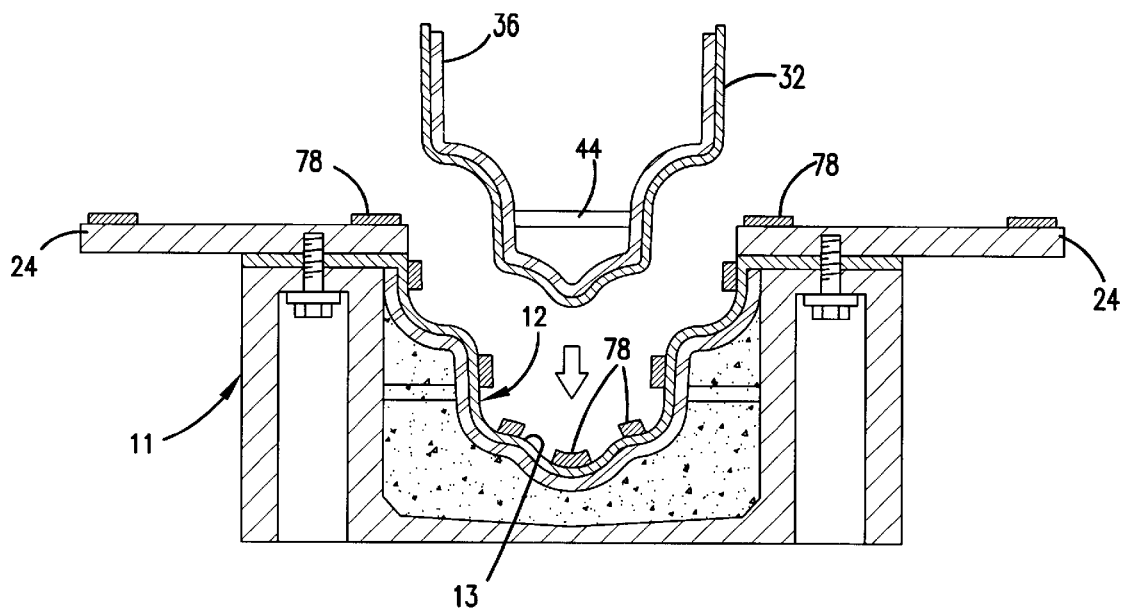
FIGS. 17A, 17D and 18 are vertical cross-sectional views showing the manner in which a back-up material is applied to the rear surface of the punch panel, thereby producing a press-forming punch.

Subsequently, at a seventh step (ST26 shown in FIG. 10), the press-forming die 11 is placed on a table (not shown) with the die panel 12 facing upward, as shown in FIG. 17A. Then, shims 78 having the same thickness as a final product (not shown) are properly attached to a recessed working surface 13 and the die face 24. The shims 78 may be replaced by a final panel product.

Thereafter, a backing material 36 is attached to the rear surface of the punch panel 32, and positioning and reinforcing strips 44 are then set on the back of the punch panel 32, as shown in FIG. 17A. The punch panel 32 is subsequently moved toward the press-forming die 11.

Figure 17B:
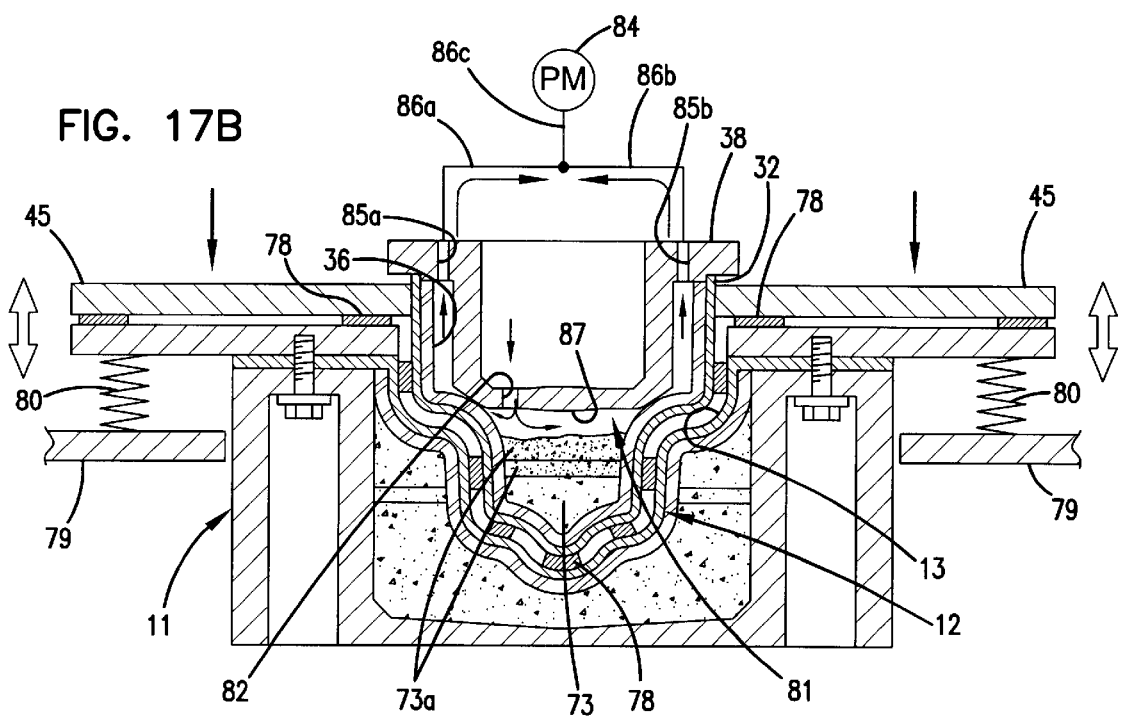

As shown in FIG. 17B, the punch panel 32 is placed on the recessed, working surface 13 via the shims 78, a blank holder 45 is set on the die face 24 via the shims 78, and a frame 38 is set on the punch panel 32, as shown in FIG. 17B. In this instance, the punch panel 32 is held immovable by the blank holder 45. Thus, the punch panel 32 and the frame 38 are set on the press-forming die 11.

The press-forming die 11 carrying thereon the punch panel 32 and frame 38 is set on a vibrator schematically illustrated in the form of springs 80 acting between the press-forming die 11 and a horizontal table 79. The vibrator 80 is driven to shake or oscillate the press-forming die 11, press panel 32 and frame 38 in the vertical direction. While keeping this condition, a slurry of high-strength cement 73 is set or placed in a space 81 defined between the frame 38 and the punch panel 32 (backing material 36). To this end, the frame 38 has an opening 82 from which the cement slurry 73 is supplied. While the cement slurry 73 is placed, the positioning and reinforcing strips 44 (FIG. 17A) keep the punch panel 32 in position against displacement relative to the frame 38.

Simultaneous with placing of the high-strength cement slurry 73 into the space 81, a vacuum pump 84 (FIG. 17B) is driven to remove babbles 73a from the high-strength cement 73.

By driving the vacuum pump 84, the space 81 is evacuated so that air babbles 73a contained in the cement slurry 73 are drawn into the space 71. In this instance, vertical vibration applied from the vibrator 80 through the frame 38 and punch panel 32 to the cement slurry 73 being placed promotes separation of the air babbles 73a from the cement slurry 73. The combination of the vacuum action and vibratory movement insures complete deaeration of the cement slurry 73.

Air collected in the space 81 is socked through outlets 85a, 85b and conduits 86a–86c into the vacuum pump 84 and discharged to the outside air. During that time, air inside the space 81 is smoothly guided into the outlet 85a, 85b because a conical upper inside surface 87 of the frame 38 is shaped to diverge toward an outer peripheral surface of the frame in which the outlets 85a, 85b are located. This improves the evacuation efficiency.

Figure 18:
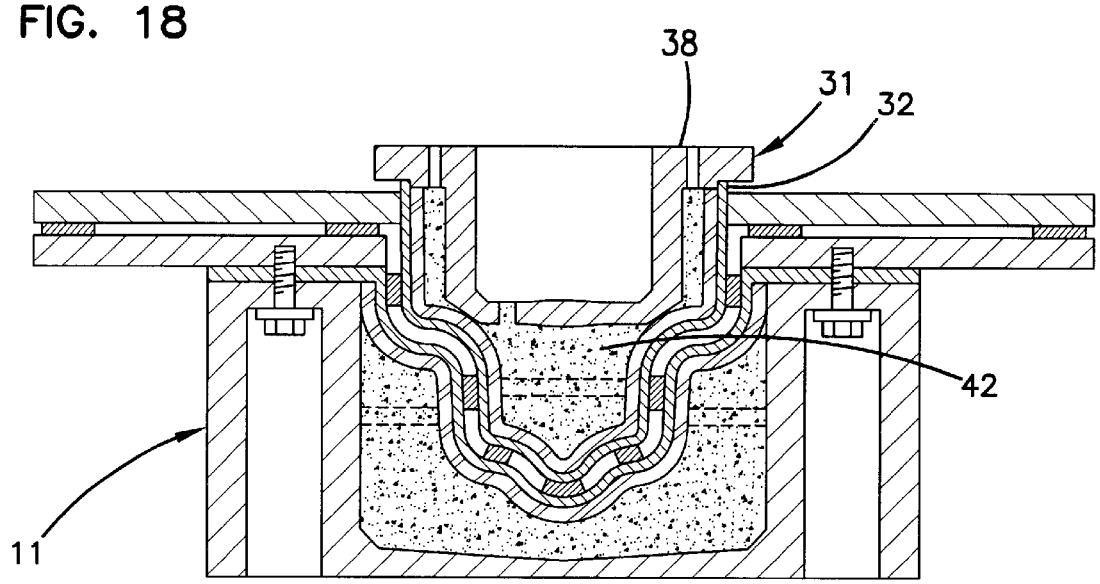

When the high-strength cement 73 (FIG. 17B) placed in the space 81 is solidified, a back-up material 42 is formed, as shown in FIG. 18. A press-forming punch 31 is thus produced.

Since the high-strength cement 73 being placed is deaerated, the back-up material 42 is completely free from cavities and hence has high durability. This increases the durability of the press-forming punch 31 as a whole. In addition, since the punch panel 32 and the frame 38 set on the press-forming die 11 is stable in position, placement of the high-strength cement can be achieved with utmost ease.

According to the method as described above, when the half-pressed panel 56 is forced against the press-formed panel 53 via the elastic material 59, the elastic material 59 elastically deforms to assume the profile of the half-pressed panel 56. This ensures that the half-pressed panel 56 is forced by a pressure or force distributed uniformly over the entire surface of the half-pressed panel 56. With this uniform pressure distribution, the half-pressed panel 56 is shaped into a punch panel 32 which is complementary in contour to the shape of the press-formed panel 53. The punch panel 32 forms a working surface of the press-forming punch 31. It will be appreciated that the press-forming punch 31 can be easily produced as compared by the conventional die because the working surface thereof does not require a conventional cutting process as done on a numerically controlled working machine or a profiling machine.

Figure 19B:
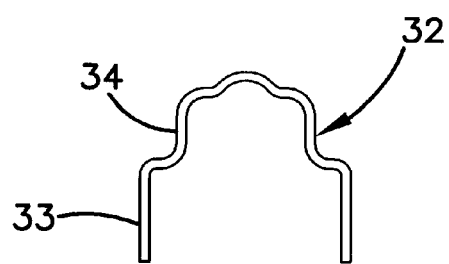

FIGS. 19A and 19B show a modification of the process shown in FIG. 16D. According to this modification, a shaping plate 90 is attached to a lower surface of the master die 50. The shaping plate 90 has a shaping edge 90a formed as a downward extension of an open end edge of the recessed working surface of the master die 50. The thickness t of the shaping plate 90 is slightly greater than the length L of the radially projecting lower edge portion 76a of the secondary punch panel blank 76. The shaping plate 90 is preferably formed from metal, such as steel or cast iron, or synthetic resin.

In operation, after the secondary punch panel blank 76 is fitted over the thinned working surface of the master punch 51, the master die 50 is descended toward the master punch 51 so that the radially projecting lower edge portion 76a of the punch panel blank 76 is shaped into a rectilinear configuration by means of the shaping plate 90. The shaping plate 90 makes the manual hammering process shown in FIG. 16D unnecessary and increases the efficiency of the punch-forming process.

Although in the illustrated embodiment, the die panel 12 and the punch panel 32 are made of high-tensile steel or stainless steel, other materials can be used for the die and punch panels in view of the surface hardness of a blank sheet to be press-formed into a panel-like product. Likewise, materials for the back-up member 27, 42 are not limited to a high-strength cement or synthetic resin as described above with reference to the illustrated embodiment. Additionally, the elastic material 59, 73 may be attached by bonding to the rear surface of the half-pressed panel 56.

In the illustrated embodiment, the master punch 52 is a fixed or stationary punch and the master die is a movable die. As an alternative, the master punch may be a movable punch and the master die is a stationary die.

Further, the spacer blocks 54a, 54b used for reducing the downward stroke of the master die 50 may be omitted when the press machine used for carrying out the inventive method is of the mechanical press in which a stroke adjuster is usually incorporated.

In the illustrated embodiment, the press-forming die assembly 10 is so designed as to manufacture a fuel tank of a motorcycle. The method of the present invention is not limited to the motorcycle fuel tank but can be also applied to the production of outer and inner panels of vehicle bodies, bonnets, alternator covers and so on of the motor vehicle.

Obviously, various minor changes and modifications of the present invention are possible in the light of the above teaching. It is therefore to be understood that within the scope of the appended claims, the present invention may be practiced otherwise than as specifically described.

What is claimed is:

1. A method of producing a press-forming die, comprising the steps of:

preparing a master die and a master punch relatively movable toward and away from each other so as to define therebetween a die cavity;

relatively reciprocating the master die and the master punch together while a first blank sheet is disposed between the master die and the master punch, thereby press-forming the first blank sheet into a press-formed panel complementary in contour to the shape of the die cavity.

while a second blank sheet is disposed between the in master die and the master punch, relatively reciprocating the master die and the master punch together with a stroke smaller than the stroke achieved when the press-formed panel is produced, thereby producing a half-pressed panel;

applying an elastic material onto one surface of the half-pressed panel which has been situated in face to face with the master die;

fitting the press-formed panel over the master punch and placing the half-pressed panel over the press-formed panel with the elastic material facing away from the press-formed panel;

forcing the half-pressed panel against the press-formed panel via the elastic material to thereby shape the half-pressed panel into a die panel complementary in contour to the shape of the press-formed panel; and applying a back-up material to the rear surface of the die panel to thereby produce a press-forming die.

2. The method according to claim 1, between the forcing step and the back-up material applying step, comprising the additional step of applying a backing material to the rear surface of the die panel.

3. The method according to claim 2, wherein the backing material comprises a water-soluble epoxy resin.

4. The method according to claim 2, wherein the backing material comprises a fibre-reinforced water-soluble epoxy resin.

5. The method according to claim 1, wherein the die panel is made of steel and has been subjected to work-hardening processes when the second blank sheet is press-formed into the half-pressed panel and the half-pressed panel is forced against the press-formed panel.

6. The method according to claim 1, wherein the elastic material comprises urethane rubber.

7. The method according to claim 1, wherein the die panel has a rectilinear portion extending parallel to the axis of relative movement of the master die and the master punch, and the elastic material is elastically deformable to an extent more than twice the thickness of the second blank sheet.

8. The method according to claim 1, wherein the back-up material comprises a high-strength cement.

9. The method according to claim 1, wherein the back-up material comprises a synthetic resin.

10. The method according to claim 1, wherein the back-up material applying step includes placing a slurry of high-strength cement on the rear surface of the die panel while removing bubbles from the slurry by the action of a vacuum.

11. The method according to claim 10, wherein the back-up material applying step further includes applying vibrations to the slurry to promote seperation of the bubbles from the slurry.

12. A method of producing a press-forming punch, comprising the steps of:

preparing a master die and a master punch relatively movable toward and away from each other so as to define therebetween a die cavity;

relatively reciprocating the master die and the master punch together while a first blank sheet is disposed between the master die and the master punch, thereby press-forming the first blank sheet into a press-formed panel complementary in contour to the shape of the die cavity;

while a second blank sheet is disposed between the master die and the master punch, relatively reciprocating the master die and the master punch together with a stroke smaller than the stroke achieved when the press-formed panel is produced, thereby producing a half-pressed panel;

applying an elastic material onto one surface of the half-pressed panel which has been situated face to face with the master punch;

fitting the press-formed panel over the master die and placing the half-pressed panel over the press-formed panel with the elastic material facing away from the press-formed panel;

forcing the half-pressed panel against the press-formed panel via the elastic material to thereby shape the half-pressed panel into a punch panel complementary in contour to the shape of the press-formed panel; and applying a back-up material to the rear surface of the punch panel to thereby produce a press-forming punch.

13. The method according to claim 12, between the forcing step and the back-up material applying step, comprising the additional step of applying a backing material to the rear surface of the punch panel.

14. The method according to claim 13, wherein the backing material comprises a water-soluble epoxy resin.

15. The method according to claim 13, wherein the backing material comprises a fibre-reinforced water-soluble epoxy resin.

16. The method according to claim 12, wherein the punch panel is made of steel and has been subjected to work-hardening processes when the second blank sheet is press-formed into the half-pressed panel and the half-pressed panel is forced against the press-formed panel.

17. The method according to claim 12, wherein the elastic material comprises urethane rubber.

18. The method according to claim 12, wherein the punch panel has a rectilinear portion extending parallel to the axis of relative movement of the master die and the master punch, and the elastic material is elastically deformable to an extent more than twice the thickness of the second blank sheet.

19. The method according to claim 12, wherein the back-up material comprises a high-strength cement.

20. The method according to claim 12, wherein the back-up material comprises a synthetic resin.

21. The method according to claim 12, wherein the back-up material applying step includes placing a slurry of high-strength cement on the rear surface of the punch panel while removing bubbles from the die slurry by the action of a vacuum.

22. The method according to claim 21, wherein the back-up material applying stop further includes applying vibrations to the slurry to promote separation of the bubbles from the slurry.

* * * * *